(12) United States Patent
Martin

(10) Patent No.: US 7,985,787 B2
(45) Date of Patent: Jul. 26, 2011

(54) METHOD FOR PREPARING AN IMPROVED BITUMEN BY ADDITION OF POLYPHOSPHORIC ACID AND A CROSS-LINKABLE POLYMER

(76) Inventor: Jean-Valery Martin, Hopewell, NJ (US)

( * ) Notice: Subject to any disclaimer, the term of this patent is extended or adjusted under 35 U.S.C. 154(b) by 162 days.

(21) Appl. No.: 11/809,086

(22) Filed: May 31, 2007

(65) Prior Publication Data

US 2007/0287778 A1    Dec. 13, 2007

Related U.S. Application Data

(60) Provisional application No. 60/809,592, filed on May 31, 2006.

(51) Int. Cl.
C08L 95/00 (2006.01)
C08K 5/49 (2006.01)

(52) U.S. Cl. .......................... 524/59; 524/121

(58) Field of Classification Search ...... 524/59
See application file for complete search history.

(56) References Cited

U.S. PATENT DOCUMENTS

| | | | |
|---|---|---|---|
| 2,693,425 A | 11/1954 | Hardman | |
| 4,554,313 A | 11/1985 | Hagenbach et al. | |
| 4,567,222 A | 1/1986 | Hagenbach et al. | |
| 5,565,510 A | 10/1996 | Giavarini et al. | |
| 5,618,862 A | 4/1997 | Germanaud et al. | |
| 5,756,565 A | 5/1998 | Germanaud et al. | |
| 5,880,185 A * | 3/1999 | Planche et al. | 524/68 |
| 5,990,207 A | 11/1999 | Perret et al. | |
| 6,011,095 A | 1/2000 | Planche et al. | |
| 6,024,788 A | 2/2000 | Tomioka et al. | |
| 6,117,926 A | 9/2000 | Engber et al. | |
| 6,399,680 B1 | 6/2002 | Engber et al. | |
| 7,417,082 B2 | 8/2008 | Martin | |
| 7,446,139 B2 | 11/2008 | Martin | |
| 7,495,045 B2 | 2/2009 | Buras et al. | |
| 2006/0089429 A1 * | 4/2006 | Buras et al. | 524/59 |
| 2006/0250886 A1 | 11/2006 | Dupuis et al. | |

FOREIGN PATENT DOCUMENTS

| | | |
|---|---|---|
| EP | 0 157 210 | 9/1985 |
| EP | A-0409683 | 1/1991 |
| EP | A-0360656 | 1/1994 |
| FR | A-2528439 | 12/1983 |
| FR | 2732702 | 10/1996 |
| WO | WO 97/14753 | 4/1997 |

OTHER PUBLICATIONS

English Language Abstract of FR2732702.

* cited by examiner

*Primary Examiner* — Ling-Siu Choi
*Assistant Examiner* — Hui Chin
(74) *Attorney, Agent, or Firm* — Eric Grondahl

(57) ABSTRACT

Methods are provided for preparing a bitumen product having improved properties for use in asphalt road paving. In a preferred embodiment, polyphosphoric acid is added to heated bitumen and stirred for a period of time. After addition of the polyphosphoric acid, one or more sulfur-crosslinkable elastomers and one or more sulfur donor coupling agents is added to the heated bitumen and mixed. The polyphosphoric acid, sulfur-crosslinkable elastomers and sulfur donor coupling agents may also be added to separate quantities of bitumen, and the bitumens may be combined prior to use to obtain a final bitumen product having the desired characteristics.

6 Claims, No Drawings

US 7,985,787 B2

METHOD FOR PREPARING AN IMPROVED BITUMEN BY ADDITION OF POLYPHOSPHORIC ACID AND A CROSS-LINKABLE POLYMER

CROSS-REFERENCE TO PRIORITY APPLICATION

This patent application claims priority under 35 U.S.C. §119(e) to U.S. Provisional Patent Application No. 60/809,592 filed May 31, 2006, entitled "Method for Preparing an Improved Bitumen by Addition of Polyphosphoric Acid and a Cross-Linkable Polymer", which is hereby expressly incorporated by reference in its entirety as part of the present disclosure.

FIELD OF THE INVENTION

The present invention relates to a process for preparation of improved bitumen binders by addition of polyphosphoric acid (PPA) to bitumen, followed by addition of a polymer and a cross-linking agent. The invention further relates to the application of the improved bitumen binders for road surfacing (i.e., pavement), coatings or other applications. The bitumen binders of the present invention exhibit improved properties. For example, the bitumen binders may have a wider plasticity range as compared to other bitumens prepared without the additives or by another method.

BACKGROUND

Bitumens are often used as a binder material in asphalts used to pave roads or other surfaces. Examples of bitumens that may be used in the compositions and methods of the present invention include natural bitumens, pyrobitumens and artificial bitumens. Bitumens that are particularly preferred are those used for roadways, such as asphalt or maltha. Asphalt paving material is made by mixing the asphalt binder with aggregate.

Asphalt binders comprising bitumens are frequently used in applications where there can be a wide variation in environmental conditions, particularly when used in pavements. Accordingly, the properties of the asphalt binder in high and low temperature conditions is a concern. At low temperatures, some binder materials can become brittle, leading to long transverse fissures due to thermal stress. At higher temperatures, the asphalt binder becomes more fluid (i.e. the viscosity is lower), which can lead to rutting of a pavement due to the passage of vehicles over the surface. Resistance to fatigue and impact, and the adherence of the asphalt binder to aggregate in paving applications, are properties of a particular binder that also must be considered in particular applications. Some asphalt binders may require a relatively high elastic behavior, for example where the corresponding asphalt paving mixture is used in areas of high traffic rates and high loads.

Various methods have been developed in an attempt to improve the plasticity of bitumens and improve the wear of asphalts made using the bitumen binders. For example, in U.S. Pat. No. 5,618,862, a method is described in which bitumen is combined with a sulfur-crosslinkable elastomer and a sulfur donating coupling agent to form a sulfur vulcanized reaction mixture. The sulfur vulcanized reaction mixture is then combined with an acid adjuvant to produce a modified bitumen product. According to this method, the acid adjuvant is not added to the bitumen until after the sulfur vulcanization is complete.

It would be desirable for having a method for making a modified bitumen for use in asphalts that is simplified. Accordingly, among the objects of the present invention is to provide methods of making a modified bitumen material with improved elasticity, and having acceptable properties for use as a binder material in asphalt pavements.

SUMMARY OF THE INVENTION

The present invention provides methods for producing an improved bitumen product for use in preparing asphalt binders for road pavements. In one aspect, the methods of the present invention comprise adding an acid, such as for example polyphosphoric acid (PPA), to heated bitumen. After the PPA is mixed with the bitumen, an elastomer and a coupling agent are added to the heated bitumen and mixed for a sufficient period of time to produce the modified bitumen product.

In another embodiment of the methods of the present invention, a master batch of bitumen is prepared, which may include an elastomer and coupling agent, or an acid such as PPA with either one of the elastomer or coupling agent. An asphalt diluent is prepared which contains only one of an acid such as PPA, the elastomer or the coupling agent. Prior to use, a quantity of the master batch is combined with a quantity of the diluent to prepare a modified bitumen product having the desired final concentrations of PPA, the elastomer and the diluent.

The bitumen prepared by the methods of the present invention has improved elasticity properties, making it desirable for use in asphalt pavement compositions.

DESCRIPTION OF THE PREFERRED EMBODIMENTS

In one embodiment, the method of the present invention comprises the steps of providing a bitumen or mixture of bitumens and heating the bitumen to a temperature of between 100° C. and 230° C. while stirring. Polyphosphoric acid (PPA) is added to the heated bitumen with stirring, preferably for a period of at least 10 minutes. Other acids may be added in addition to the polyphosphoric acid. For example, sulfuric acid or organosulfuric acids may be added in combination with the PPA. The total weight of acid added to the bitumen is between 0.005% to 5% by weight of the weight of the bitumen or mixture of bitumens.

Following addition and mixing of the acid component, a sulfur cross-linkable elastomer and a sulfur-donor coupling agent are added to the bitumen while maintaining the temperature of the bitumen at between 100° C. and 230° C. with stirring, preferably for a period of at least 10 minutes. The sulfur cross-linkable elastomer is provided in an amount of between 0.5% to 20% by weight of the weight of the bitumen or mixture of bitumens. The sulfur-donor coupling agent is provided in an amount capable of providing an amount of free sulfur representing between 0.1% and 20% of the weight of the sulfur cross-linkable elastomer.

The acid additive is preferably composed of PPA or a combination of acids containing, by weight, 5% to 100% and more preferably 20% to 100% of one or a number of polyphosphoric acids, and 95% to 0% and more preferably 80% to 0% of at least one acid chosen from the group consisting of sulfuric acid and acids of the general formula R—(COO)$_r$—SO$_3$H. The acid additive combination is preferably composed of a combination comprising, by weight, 20% to 95% and more preferably 40% to 90% of one or a number of polyphosphoric acids, and 80% to 5% and more preferably 60% to 10% of sulfuric acid and/or of methanesulphonic acid.

When the acid additive is composed of a plurality of acidic compounds, for example combination of a polyphosphoric acid and of sulfuric acid, the acidic compounds can be incorporated either as a mixture or successively into the bitumen.

The polyphosphoric acids which can be used in the process according to the invention are compounds of empirical formula $P_qH_rO_s$ in which q, r and s are positive numbers such that q is greater than or equal to 2, and preferably ranging from 3 to 20 or more, such that $5q+r-2s=0$.

In particular, the polyphosphoric acids can be linear compounds of empirical formula $P_qH_{q+2}O_{3q+1}$, or can alternatively be products with a two-dimensional structure, indeed even three-dimensional structure. All these polyphosphoric acids can be polycondensation products formed from heating aqueous metaphosphoric acid.

The acids of formula $R—(COO)_t—SO_3H$ are either sulphonic acids of formula $R—SO_3H$, when $t=0$, or acids of formula $R—COO—SO_3H$, when $t=1$. The acids of formula $R—COO—SO_3H$ can be regarded as adducts of monocarboxylic acids, $R—COOH$ and of $S_3$ or alternatively as mixed anhydrides of monocarboxylic acids of formula $R—COOH$ and of sulfuric acid. In these acids of formula $R—(COO)_t—SO_3H$, the radical R is preferably a $C_1$ to $C_{12}$, and more preferably a $C_1$ to $C_8$ hydrocarbyl radical. The radical R can comprise a linear or branched $C_1$ to $C_{12}$ and more especially $C_1$ to $C_8$ alkyl radical, such as for example a methyl, ethyl, propyl, butyl, hexyl or octyl radical, a $C_4$ to $C_{12}$, and preferably $C_6$ to $C_8$ cycloalkyl radical, or alternatively a monovalent $C_6$ to $C_{12}$ and preferably $C_6$ to $C_8$ aromatic radical, in particular phenyl or tolyl, for the aromatic radical, and cyclohexyl, cyclopentyl or cycloheptyl for the cycloalkyl radical. Examples of sulphonic acids of formula $R—SO_3H$ which can be employed in the process according to the invention are methanesulphonic acid, ethanesulphonic acid, propanesulphonic acid, benzenesulphonic acid and toluenesulphonic acid, and preferably methanesulphonic acid and ethanesulphonic acid. Acids of formula $R—COO—SO_3H$, such as the acids $CH_3—COO—SO_3H$ and $CH_3—CH_2—COOSO_3H$, which are adducts of $SO_3$ with acetic acid and propionic acid respectively, may also be used.

The bitumen, or mixture of bitumens, which is employed for the implementation of the process according to the invention is preferably chosen from the various bitumens which have a kinematic viscosity at 100° C. of between $0.5×10^{-4}$ $m^2/s$ and $3×10^{-2}$ $m^2/s$, and preferably between $1×10^{-4}$ $m^2/s$ and $2×10^{-2}$ $m^2/s$. These bitumens may be direct distillation or vacuum distillation bitumens, blown or semiblown bitumens, propane or pentane deasphalting residues, viscosity breaking residues, or some petroleum cuts or mixtures of bitumens and of vacuum distillates, or mixtures of two or more of the products listed above. In addition to having a kinematic viscosity within the ranges described above, the bitumen or mixture of bitumens employed in the process according to the invention preferably has a penetrability at 25° C., defined according to NF Standard T 66004, of between 5 and 800 and preferably between 10 and 400.

The elastomer which is employed in the process according to the invention can be composed of one or a mixture of elastomeric polymers known to those skilled in the art, such as polyisoprene, polynorbornene, polybutadiene, butyl rubber, random ethylene/propylene (EP) copolymers or random ethylene/propylene/diene (EPDM) terpolymers. The elastomer is preferably composed partially (the remaining part being composed of one or a number of polymers mentioned above or other polymers) or entirely of one or a number of random or block copolymers of styrene and of a conjugated diene, such as butadiene, isoprene, chloroprene, carboxylated butadiene or carboxylated isoprene, and more particularly of one or a number of copolymers chosen from block copolymers, with or without a random hinge, of styrene and of butadiene, of styrene and of isoprene, of styrene and of chloroprene, of styrene and of carboxylated butadiene or alternatively of styrene and of carboxylated isoprene. The copolymer of styrene and of conjugated diene, and in particular each of the abovementioned copolymers, preferably has a styrene content by weight ranging from 5% to 50%. The weight-average molecular weight of the copolymer of styrene and of conjugated diene, and in particular that of the copolymers described above, can be, for example, between 10,000 and 600,000 daltons and preferably lies between 30,000 and 400,000 daltons. The copolymer of styrene and of conjugated diene is preferably chosen from di- or tri-block copolymers of styrene and of butadiene, of styrene and of isoprene, of styrene and of carboxylated butadiene or alternatively of styrene and of carboxylated isoprene which have styrene contents and weight-average molecular weights which lie within the ranges defined above.

The sulfur-donor coupling agent which is employed in the preparation of the bitumen/polymer compositions according to the invention may be composed of a product chosen from the group consisting of elemental sulfur, hydrocarbyl polysulfides, sulfur-donor vulcanization accelerators or mixtures of such products with one another and/or with vulcanization accelerators which are not sulfur donors. In particular, the sulfur-donor coupling agent may be chosen from the products M, which contain, by weight, from 0% to 100% of a component A composed of one or a number of sulfur-donor vulcanization accelerators and from 100% to 0% of a component B composed of one or a number of vulcanizing agents chosen from elemental sulfur and hydrocarbyl polysulphides, and the products N, which contain a component C composed of one or a number of vulcanization accelerators which are not sulfur donors and a product M in a ratio by weight of the component C to the product M ranging from 0.01 to 1 and preferably from 0.05 to 0.5.

The elemental sulfur capable of being employed for constituting, partially or entirely, the coupling agent is preferably sulfur in powder form and more preferably sulfur crystallized in the orthorhombic form and known by the name of alpha sulfur.

The hydrocarbyl polysulfides capable of being employed to form a part or all of the coupling agent may be chosen from those defined in reference FR-A-2,528,439, the contents of which are hereby incorporated by reference, and correspond to the general formula $R_1—(S)_m—(R_5—(S)_m)_x—R_2$, in which $R_1$ and $R_2$ denote a saturated or unsaturated $C_1$ to $C_{20}$ monovalent hydrocarbon radical or are connected to one another to constitute a saturated or unsaturated $C_1$ to $C_{20}$ divalent hydrocarbon radical forming a ring with the other groups of atoms associated in the formula, $R_5$ is a saturated or unsaturated $C_1$ to $C_{20}$ divalent hydrocarbon radical, the $—(S)_m—$ groups represent divalent groups each formed from m sulfur atoms, the values of m being able to differ from one of the said groups to another and denoting integers ranging from 1 to 6 with at least one of the values of m equal to or greater than 2, and x represents an integer having a value between zero to 10. Preferred polysulfides correspond to the formula $R_3—(S)_p—R_3$ in which $R_3$ denotes a $C_6$ to $C_{16}$ alkyl radical, for example hexyl, octyl, dodecyl, tert-dodecyl, hexadecyl, nonyl or decyl, and $—(S)_p—$ represents a divalent group formed from a chain sequence of p sulfur atoms, p being an integer ranging from 2 to 5.

When the coupling agent contains a sulfur-donor vulcanization accelerator, the latter may be chosen in particular from the thiuram polysulfides of formula $(R_4)_2NCS(S)_uCSN(R_4)_2$ in which the symbols $R_4$, which are identical or different, each represent a $C_1$ to $C_{12}$ and preferably $C_1$ to $C_8$ hydrocarbon radical, especially an alkyl, cycloalkyl or aryl radical, or else two $R_4$ radicals attached to the same nitrogen atom are bonded together to form a $C_2$ to $C_8$ divalent hydrocarbon radical and u is a number ranging from 2 to 8. Examples of vulcanization accelerators that may be used in the methods of the present invention include dipentamethylenethiuram disulphide, dipentamethylenethiuram tetrasulphide, dipentamethylenethiuram hexasulphide, tetrabutylthiuram disulphide, tetraethylthiuram disulphide and tetramethylthiuram disulphide.

Other examples of sulfur-donor vulcanization accelerators which may be used in the methods of the present invention include alkylphenol disulfides and disulfides such as morpholine disulphide and N,N'-caprolactam disulfide.

Vulcanization accelerators which are not sulfur donors and which can be employed for forming the component C of the coupling agents of the product N type described above may be sulfur compounds chosen especially from mercaptobenzothiazole and its derivatives, especially benzothiazole metal thiolates and benzothiazolesulphenamides, dithiocarbamates of formula $[(R_4)_2NCS_2]_vY$ where $R_4$ is identical or different and has the structure described above, Y represents a metal and v denotes the valency of Y, and thiuram monosulphides of formula $(R_4)_2NCSSCSN(R_4)_2$ in which $R_4$ is defined as described above.

Examples of vulcanization accelerators of the mercaptobenzothiazole type include mercaptobenzothiazole, benzothiazole thiolate of a metal such as zinc, sodium or copper, benzothiazyl disulphide, 2-benzothiazolepentamethylenesulphenamide, 2-benzothiazolethiosulphenamide, 2-benzothiazoledihydrocarbylsulphenamides in the case of which the hydrocarbyl radical is an ethyl, isopropyl, tert-butyl or cyclohexyl radical, and N-oxo-diethylene-2-benzothiazolesulphenamide.

Among the vulcanization accelerators of the dithiocarbamate type described above are, for example, dimethyldithiocarbamates of metals such as copper, zinc, lead, bismuth and selenium, diethyldithiocarbamates of metals such as cadmium and zinc, diamyldithiocarbamates of metals such as cadmium, zinc and lead, and lead or zinc pentamethylenedithiocarbamate. Examples of thiuram monosulfides which have the formula given above include dipentamethylenethiuram monosulfide, tetramethylthiuram monosulfide, tetraethylthiuram monosulfide and tetrabutylthiuram monosulfide.

Other vulcanization accelerators which are not sulfur donors and which do not belong to the classes defined above may also be employed in the methods of the present invention. Such vulcanization accelerators may include 1,3-diphenylguanidine, diorthotolylguanidine and zinc oxide. Zinc oxide may be used optionally in the presence of fatty acids of the stearic acid, lauric acid or ethylcaproic acid type.

For further details on the sulfur-donor vulcanization accelerators and those which are not sulfur donors which can be employed in the coupling agent, reference may be made to EP-A-0,360,656, EP-A-0,409,683 and FR-A-2,528,439, the contents of each of which are incorporated in the present description by reference.

As discussed above, the coupling agent may be of the single-component or of the multicomponent type where the coupling agent is of the multicomponent type, the components may be combined before addition to the bitumen, or, alternatively, the components may be combined in situ in the bitumen mixture. The coupling agent, whether of the multicomponent type pre-mixed, of the single-component type, or of the multicomponent type combined in situ may be used as they are, for example in the molten state, or else mixed (for example in solution or in suspension) with a diluent (for example a hydrocarbon compound).

The process for the preparation of the bitumen/polymer compositions according to the invention is performed by first adding to the bitumen or mixture of bitumens the acid additive, such as PPA or a combination of PPA and another acid, in an amount of between about 0.005% to 5 by weight of the total weight of the bitumen or mixture of bitumens. The acid additive/bitumen mixture is maintained at a temperature of between 100° C. and 230° C., preferably between 120° C. and 190° C., with stirring for a time period of between 10 minutes to 5 hours, preferably from 30 minutes to 4 hours.

Following addition of the acid additive, the sulfur-crosslinkable elastomer is added to the bitumen or mixture of bitumens in an amount of between 0.5% to 20% of the weight of the bitumen or mixture of bitumens. The elastomer is added to the bitumen with the mixture maintained at temperatures of between 100° C. and 230° C., preferably between 120° C. and 190° C., with stirring, for a sufficient period of time, generally of the order of a few tens of minutes to a few hours, typically between about 1 hour to 8 hours, to form a homogeneous mixture. The sulfur-donor coupling agent is added to the mixture in amount capable of providing an amount of free sulfur of between 0.1% and 20% by weight of the weight of the sulfur cross-linkable elastomer. The mixture is maintained with stirring at temperatures of between 100° C. and 230° C., preferably between 120° C. and 190° C., for a period of time of at least 10 minutes and generally ranging from 10 minutes to 5 hours, and preferably from 30 minutes to 180 minutes, in order to form a reaction product constituting the crosslinked bitumen/polymer composition.

In another embodiment of the present invention, the one or more sulfur cross-linkable elastomers and the one or more coupling agents are first added to the bitumen with stirring at the concentrations and temperature conditions described above to form a master batch. PPA is added to a separate quantity of asphalt with stirring at the concentrations and temperatures described above to create an asphalt diluent. Prior to use, the master batch is diluted using the asphalt diluent containing PPA to obtain an asphalt mixture having the desired characteristics and concentrations of elastomers, coupling agents and PPA in the final mixture. The concentrations of elastomers and coupling agents in the master batch, and the concentration of PPA in the asphalt diluent, may be adjusted to achieve the desired concentrations in the final asphalt mixture.

In yet another embodiment of the present invention, the one or more sulfur cross-linkable elastomers and the PPA are first added to the bitumen with stirring at the concentrations and temperature conditions described above to form a master batch. The one or more sulfur donor coupling agents are added to a separate quantity of asphalt with stirring at the concentrations and temperatures described above to create an asphalt diluent. Prior to use, the master batch is diluted using the asphalt diluent containing the coupling agent to obtain an asphalt mixture having the desired characteristics and concentrations of elastomer, coupling agent and PPA in the final mixture. The concentrations of elastomers and PPA in the master batch, and the concentration of coupling agents in the asphalt diluent, may be adjusted to achieve the desired concentrations in the final asphalt mixture. The process may also be performed as described above using the coupling agent and PPA in the master batch and the sulfur cross-linkable elastomer in the asphalt diluent.

The reaction mixture formed from the bitumen or mixture of bitumens, the acid additive, the sulfur-crosslinkable elastomer and the sulfur-donor coupling agent, may further have added to it 1% to 40% and preferably 2% to 30%, by weight of the bitumen, of a fluxing agent which may be composed, in particular, of a hydrocarbon oil which has an atmospheric pressure distillation range, determined according to ASTM Standard D 86-67, of between 100° C. and 600° C., and preferably between 150° C. and 400° C. The hydrocarbon oil, which may be a petroleum cut of aromatic nature, a petroleum cut of naphtheno-aromatic nature, a petroleum cut of naphtheno-paraffinic nature, a petroleum cut of paraffinic nature, a coal oil or alternatively an oil of plant origin, should be sufficiently "heavy" to limit the evaporation at the time of its addition to the bitumen and, at the same time, sufficiently "light" to be removed as much as possible after the bitumen/polymer composition containing it has been spread, so as to regain the same mechanical properties which the bitumen/polymer composition prepared without any fluxing agent would have exhibited after hot spreading. The fluxing agent may be added to the reaction mixture, which is formed from the bitumen, the acid additive, the sulfur-crosslinkable elastomer and the sulfur-donor coupling agent, at any time during the preparation the reaction mixture, the amount of fluxing agent being chosen within the ranges defined above, in order to be compatible with the desired final use on the work site.

It is also possible to add, to the reaction mixture formed from the bitumen or mixture of bitumens, the acid additive, the sulfur-crosslinkable elastomer, the sulfur-donor coupling agent and optionally the fluxing agent, various additives at any time in the preparation of the reaction mixture. For example, nitrogenous compounds of the amine or amide type, such as those defined in EP-A-0409683, as promoters of adhesion of the final bitumen/polymer composition to the mineral surfaces may be added. Preferably, the nitrogenous compounds are incorporated in the reaction mixture before the addition of the sulfur-donor coupling agent to the reaction mixture, so that these nitrogenous compounds are grafted onto the crosslinked elastomer present in the final bitumen/polymer composition. The mixture composed of bitumen or mixture of bitumens, the acid additive, the sulfur-crosslinkable elastomer, the sulfur-donor coupling agent and optionally of the fluxing agent, can also contain, by weight of the bitumen or mixture of bitumens, 0.1% to 5%, and preferably 0.2% to 3%, of an antigelling additive, preferably added to the reaction mixture before the incorporation of the sulfur-donor coupling agent. Preferably, the antigelling additive corresponds to the formula $R_6$—X, in which $R_6$ is a saturated or unsaturated, $C_2$ to $C_{50}$ and more particularly $C_2$ to $C_{40}$, monovalent hydrocarbon radical, for example an alkyl, alkenyl, alkylaryl, alkadienyl or alkatrienyl radical or alternatively a radical of the polycyclic type containing condensed rings, and X represents a functional group —COOH, —SO$_3$H, or —PO$_3$HZ, with Z denoting a hydrogen atom or a radical $R_6$. The antigelling additive can be chosen in particular from carboxylic acids containing a saturated or unsaturated fatty chain, in particular pelargonic acid, lauric acid, stearic acid, palmitic acid or oleic acid, alkylarenesulphonic acids carrying one or two saturated or unsaturated fatty chains on the ring, in particular nonylenzenesulphonic acid, dodecylbenzenesulphonic acid or didodecylbenzenesulphonic acid, polycyclic acids containing condensed rings, in particular abietic acid and resin acids deriving therefrom, monohydrocarbyl esters and dihydrocarbyl esters of phosphoric acid, also known as monohydrocarbyl phosphoric and dihydrocarbyl phosphoric acids, in particular monoalkyl phosphoric acids and dialkyl phosphoric acids for which the alkyl radical is a $C_2$ to $C_{18}$ alkyl radical, for example ethyl, 2-ethylhexyl, octyl, nonyl, decyl, dodecyl, hexadecyl or octadecyl, mixtures of carboxylic acids containing a fatty chain and mixtures of abietic or resin acids and of carboxylic acids containing a fatty chain.

In one embodiment of the process according to the invention employing a hydrocarbon oil as defined above as fluxing agent, the sulfur-crosslinkable elastomer and the sulfur-donor coupling agent are incorporated in the bitumen or mixture of bitumens in the form of a mother solution of these products in the hydrocarbon oil constituting the fluxing agent.

The mother solution is prepared by bringing into contact the ingredients of which it is composed, namely hydrocarbon oil acting as solvent, elastomer and coupling agent, with stirring, at temperatures of between 10° C. and 170° C. and more particularly between 40° C. and 120° C., for a sufficient period of time, for example from approximately 30 minutes to approximately 90 minutes, to obtain complete dissolution of the elastomer and of the coupling agent in the hydrocarbon oil.

The respective concentrations of the elastomer and of the coupling agent in the mother solution may vary quite widely, especially as a function of the nature of the hydrocarbon oil employed for dissolving the elastomer and the coupling agent. Thus, the respective amounts of elastomer and of coupling agent may advantageously represent 5% to 40% and 0.02% to 15% of the weight of the hydrocarbon oil. A preferred mother solution contains, with respect to the weight of the hydrocarbon oil employed as solvent, 10% to 35% of elastomer and 0.1% to 5% of coupling agent.

To prepare the bitumen/polymer compositions according to the invention by producing, by the mother solution technique, following the addition of the acid additive as described above, the mother solution of the elastomer, the coupling agent and the fluxing agent is mixed with the bitumen or mixture of bitumens and acid additive, the mixing being carried out at temperatures of between 100° C. and 230° C. with stirring, this being done, for example, by adding the mother solution to the bitumen or mixture of bitumens maintained with stirring at a temperature of between 100° C. and 230° C., the resulting mixture is then maintained with stirring at a temperature of between 100° C. and 230° C., for example at the temperature employed for mixing the mother solution with the bitumen or mixture of bitumens, for a period of time of at least 10 minutes and generally ranging from 10 minutes to 90 minutes, in order to form the reaction product constituting the crosslinked bitumen/polymer composition. The amount of mother solution mixed with the bitumen or mixture of bitumens is chosen to yield the desired amounts, with respect to the bitumen or mixture of bitumens, of elastomer and of coupling agent, the said amounts being within the ranges defined above.

One embodiment which is particularly preferred for the preparation, by the mother solution technique comprises bringing from 80% to 95% by weight of bitumen or mixture of bitumens and the acid additive into contact, at temperatures of between 100° C. and 230° C. with stirring, with 20% to 5% by weight of the mother solution, the latter containing, by weight of the hydrocarbon oil acting as solvent, 10% to 35% of elastomer and 0.1% to 5% of coupling agent. The mixture thus obtained is maintained with stirring at a temperature of between 100° C. and 230° C., and preferably at the temperature employed for bringing the bitumen or mixture of bitumens into contact with the mother solution, for a period of time of at least 10 minutes and preferably ranging from 10 minutes to 60 minutes.

The bitumen/polymer compositions with a reinforced multigrade nature, that is to say with an expanded plasticity range, obtained by the process according to the invention may be employed as they are or else diluted with variable proportions of a bitumen or a mixture of bitumens or of a composition according to the invention which has different characteristics, in order to constitute bitumen/polymer binders which have a chosen content of crosslinked elastomer which may be either equal to (undiluted composition) or else lower than (diluted composition) the content of crosslinked elastomer in the corresponding initial bitumen/polymer compositions. The dilution of the bitumen/polymer compositions according to the invention with the bitumen or mixture of bitumens or with a composition according to the invention of different characteristics may be carried out either directly following the preparation of the said compositions, when a virtually immediate use of the resulting bitumen/polymer binders is required, or else alternatively after a more or less extended period of storage of the bitumen/polymer compositions, when a delayed use of the resulting bitumen/polymer binders is envisaged. The bitumen or mixture of bitumens employed for the dilution of a bitumen/polymer composition according to the invention may be chosen from the bitumens defined above as being suitable for the preparation of the bitumen/polymer compositions. If appropriate, the bitumen or mixture of bitumens employed for the dilution may itself have been pretreated with an acidic adjuvant according to the invention.

The dilution of a bitumen/polymer composition according to the invention with a bitumen or mixture of bitumens or with a second composition according to the invention with a lower content of crosslinked elastomer, in order to form a bitumen/polymer binder with a desired content of crosslinked elastomer which is lower than that in the bitumen/polymer composition to be diluted, is generally carried out by bringing into contact, with stirring at temperatures of between 100° C. and 230° C., and preferably between 120° C. and 190° C., suitable proportions of the bitumen/polymer composition to be diluted and of bitumen or mixture of bitumens or of second bitumen/polymer composition according to the invention. For example, the amount of bitumen or mixture of bitumens or of second bitumen/polymer composition employed for the dilution may be chosen so that the bitumen/polymer binder resulting from the dilution contains a content of crosslinked elastomer of between 0.5% and 5%, more preferably between 0.7% and 3%, by weight of the bitumen, and lower than the content of crosslinked elastomer in the bitumen/polymer composition according to the invention which is subjected to the dilution.

The bitumen/polymer binders consisting of the bitumen/polymer compositions according to the invention or resulting from the dilution of the said compositions with a bitumen or mixture of bitumens or with another bitumen/polymer composition according to the invention, as far as the desired content of crosslinked elastomer in the said binders, can be applied, directly or after conversion into aqueous emulsion, to the production of road surfacings of the surface coating type, to the production of bituminous mixes which are put in place with heating or cold, or else to the production of watertight facings.

The characteristics of the bitumen made in accordance with methods described herein may be determined using any standard method or technique, such as for example standard tests for penetrability, ring-and-ball softening temperature, and tensile characteristics.

It will be recognized by those skilled in the art that the compositions or methods described above may be altered in many ways without departing from the scope of the present invention. Accordingly, the preferred embodiments described herein are intended to be illustrative rather then limiting in nature.

I claim:

1. A method for producing an improved bitumen comprising the steps of:
    (a) providing a first quantity of bitumen or mixture of bitumens heated to a temperature of between about 100° C. to about 230° C.;
    (b) adding to the first quantity of bitumen or mixture of bitumens polyphosphoric acid and maintaining the resulting mixture at a temperature of between about 100° C. to about 230° C. while stirring for a period of at least about 10 minutes;
    (c) providing a second quantity of bitumen or mixture of bitumens heated to a temperature of between about 100° C. to about 230° C.;
    (d) adding to the second quantity of bitumen or mixture of bitumens at least one sulfur cross-linkable elastomer and at least one sulfur-donor coupling agent in an amount capable of providing an amount of free sulfur representing between 0.1% and 20% of the weight of the sulfur cross-linkable elastomer while maintaining the temperature of the bitumen at between 100° C. and 230° C. with stirring for a period of at least about 10 minutes
    (e) combining a sufficient amount of the first quantity of bitumen with a sufficient quantity of the second quantity of bitumen to obtain a final bitumen product having polyphosphoric acid in an amount of between about 0.005% to 5% by weight of the weight of the final bitumen product and at least one sulfur cross-linkable elastomer in an amount of between 0.5% to 20% by weight of the weight of the final bitumen product, and wherein the amount of polyphosphoric acid added to the first quantity of bitumen and the amount of the at least one sulfur cross-linkable elastomer added to the second quantity of bitumen are selected to achieve the desired concentrations of polyphosphoric acid and sulfur-crosslinkable elastomer in the final bitumen product.

2. A method for producing an improved bitumen comprising the steps of:
    (a) providing a first quantity of bitumen or mixture of bitumens heated to a temperature of between about 100° C. to about 230° C.;
    (b) adding to the first quantity of bitumen or mixture of bitumens polyphosphoric acid and at least one sulfur cross-linkable elastomer and maintaining the resulting mixture at a temperature of between about 100° C. to about 230° C. while stirring for a period of at least about 10 minutes;
    (c) providing a second quantity of bitumen or mixture of bitumens heated to a temperature of between about 100° C. to about 230° C.;
    (d) adding to the second quantity of bitumen or mixture of bitumens at least one sulfur-donor coupling agent in an amount capable of providing an amount of free sulfur representing between 0.1% and 20% of the weight of the sulfur cross-linkable elastomer while maintaining the temperature of the bitumen at between 100° C. and 230° C. with stirring for a period of at least about 10 minutes
    (e) combining a sufficient amount of the first quantity of bitumen with a sufficient quantity of the second quantity of bitumen to obtain a final bitumen product having polyphosphoric acid in an amount of between about 0.005% to 5% by weight of the weight of the final bitumen product, at least one sulfur cross-linkable elastomer in an amount of between 0.5% to 20% by weight of the weight of the final bitumen product, and at least one sulfur-donor coupling agent in an amount capable of providing an amount of free sulfur representing between 0.1% and 20% of the weight of the sulfur cross-linkable elastomer and wherein the amount of polyphosphoric acid and sulfur-crosslinkable elastomer added to the first quantity of bitumen and the amount of the at least one sulfur-donor coupling agent added to the second quantity of bitumen are selected to achieve the desired concentrations of polyphosphoric acid, sulfur-crosslinkable elastomers and sulfur-donor coupling agents in the final bitumen product.

3. The method of claim 1, wherein the cross-linkable elastomer is selected from the group consisting of polyisoprene, polynorbornene, polybutadiene, butyl rubber, random ethylene/propylene (EP) copolymers, random ethylene/propylene/diene (EPDM) terpolymers, a random or block copolymer of styrene and a conjugated diene, and mixtures thereof.

4. The method of claim 1, wherein the sulfur-donor coupling agent is selected from the group consisting of elemental sulfur, hydrocarbyl polysulfides, sulfur-donor vulcanization accelerators, and mixtures thereof.

5. The method of claim 2, wherein the cross-linkable elastomer is selected from the group consisting of polyisoprene, polynorbornene, polybutadiene, butyl rubber, random ethylene/propylene (EP) copolymers, random ethylene/propylene/diene (EPDM) terpolymers, a random or block copolymer of styrene and a conjugated diene, and mixtures thereof.

6. The method of claim 2, wherein the sulfur-donor coupling agent is selected from the group consisting of elemental sulfur, hydrocarbyl polysulfides, sulfur-donor vulcanization accelerators, and mixtures thereof.

* * * * *